US009969367B2

(12) United States Patent
Schmidt et al.

(10) Patent No.: US 9,969,367 B2
(45) Date of Patent: May 15, 2018

(54) AIR-GUIDING ARRANGEMENT AND VEHICLE WITH AT LEAST ONE AIR-GUIDING ARRANGEMENT

(71) Applicant: Bayerische Motoren Werke Aktiengesellschaft, Munich (DE)

(72) Inventors: Andreas Schmidt, Ingolstadt (DE); Daniel Engfer, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days. days.

(21) Appl. No.: 15/423,660

(22) Filed: Feb. 3, 2017

(65) Prior Publication Data

US 2017/0144636 A1    May 25, 2017

Related U.S. Application Data

(63) Continuation of application No. PCT/EP2015/068245, filed on Aug. 7, 2015.

(30) Foreign Application Priority Data

Aug. 8, 2014  (DE) ........................ 10 2014 215 732

(51) Int. Cl.
*B62D 35/02* (2006.01)
*B60T 5/00* (2006.01)
(Continued)

(52) U.S. Cl.
CPC ................ *B60T 5/00* (2013.01); *B62D 25/16* (2013.01); *B62D 35/02* (2013.01); *F16D 65/847* (2013.01); *Y02T 10/88* (2013.01)

(58) Field of Classification Search
CPC ......... B60T 5/00; F16D 65/847; B62D 35/02; B62D 25/16; Y02T 10/88
(Continued)

(56) References Cited

U.S. PATENT DOCUMENTS

| 4,810,021 A | 3/1989 | Burst |
| 5,511,847 A | 4/1996 | Weisbarth et al. |
| 2012/0013146 A1 | 1/2012 | Wolf et al. |

FOREIGN PATENT DOCUMENTS

| DE | 43 34 009 C1 | 1/1995 |
| DE | 102 13 650 A1 | 10/2003 |

(Continued)

OTHER PUBLICATIONS

International Search Report (PCT/ISA/210) issued in PCT Application No. PCT/EP2015/068245 dated Oct. 16, 2015 with English-language translation (four (4) pages).
(Continued)

*Primary Examiner* — Jason S Morrow
*Assistant Examiner* — E Turner Hicks
(74) *Attorney, Agent, or Firm* — Crowell & Moring LLP

(57) ABSTRACT

An air-guiding arrangement is provided for a vehicle. The air-guiding arrangement is arranged in the region in front of a vehicle wheel which is functionally connected to a braking system. At least one air-guiding body is positioned in front of the vehicle wheel and protrudes downwards from an underbody covering part in the direction of the roadway, and at least one duct is positioned in the air-guiding body or on that side of the air-guiding body which faces away from the outside of the vehicle, and is designed to guide incoming travel air in the direction of the braking system. The air-guiding body has a first retaining lip which is arranged between the air-guiding body and the vehicle wheel and which protrudes downward over the air-guiding body in the direction of the roadway. A second retaining lip is provided on that side of the at least one duct which faces away from the outside of the vehicle such that the at least one duct has a gap between the first retaining lip and the second retaining lip.

16 Claims, 5 Drawing Sheets

(51) Int. Cl.
*B62D 25/16* (2006.01)
*F16D 65/847* (2006.01)

(58) Field of Classification Search
USPC ............... 296/180.1, 208, 180.5, 181.5, 198
See application file for complete search history.

(56) References Cited

FOREIGN PATENT DOCUMENTS

| | | |
|---|---|---|
| DE | 10 2009 012 220 A1 | 10/2009 |
| DE | 10 2010 036 442 A1 | 1/2012 |
| DE | 10 2010 055 639 A1 | 6/2012 |
| DE | 10 2011 089 074 A1 | 6/2013 |
| EP | 1 674 381 A1 | 6/2006 |
| EP | 2 039 595 A1 | 3/2009 |

OTHER PUBLICATIONS

German-language Written Opinion (PCT/ISA/237) issued in PCT Application No. PCT/EP2015/068245 dated Oct. 16, 2015 (five (5) pages).
German Search Report issued in counterpart German Application No. 10 2014 215 732.3 dated Jun. 9, 2015 with partial English-language translation (thirteen (13) pages).

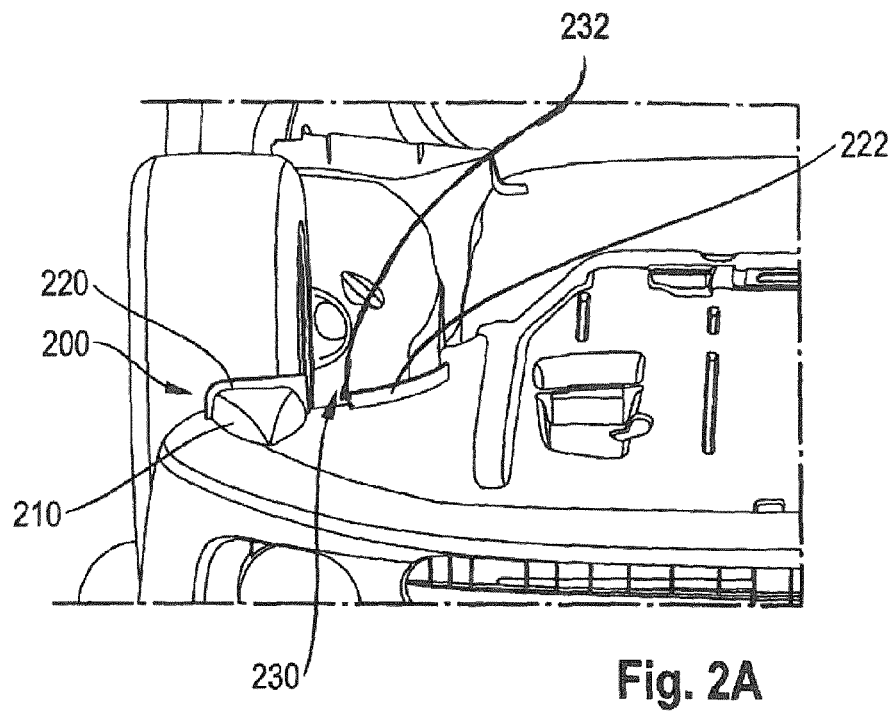
Fig. 2A
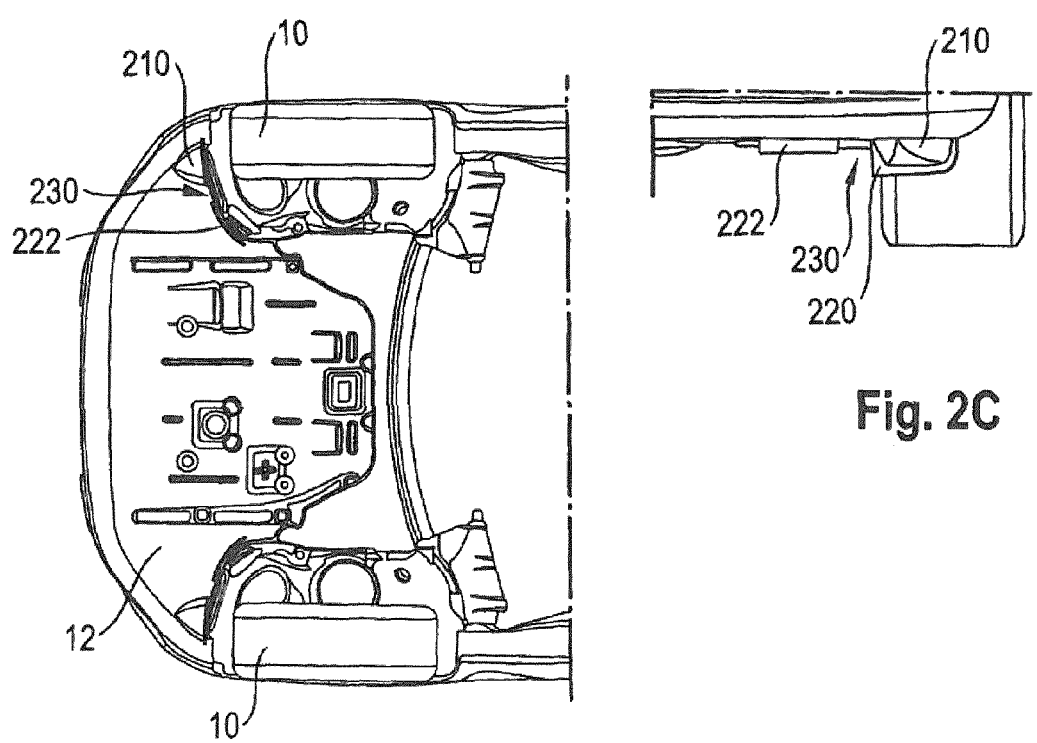
Fig. 2B
Fig. 2C

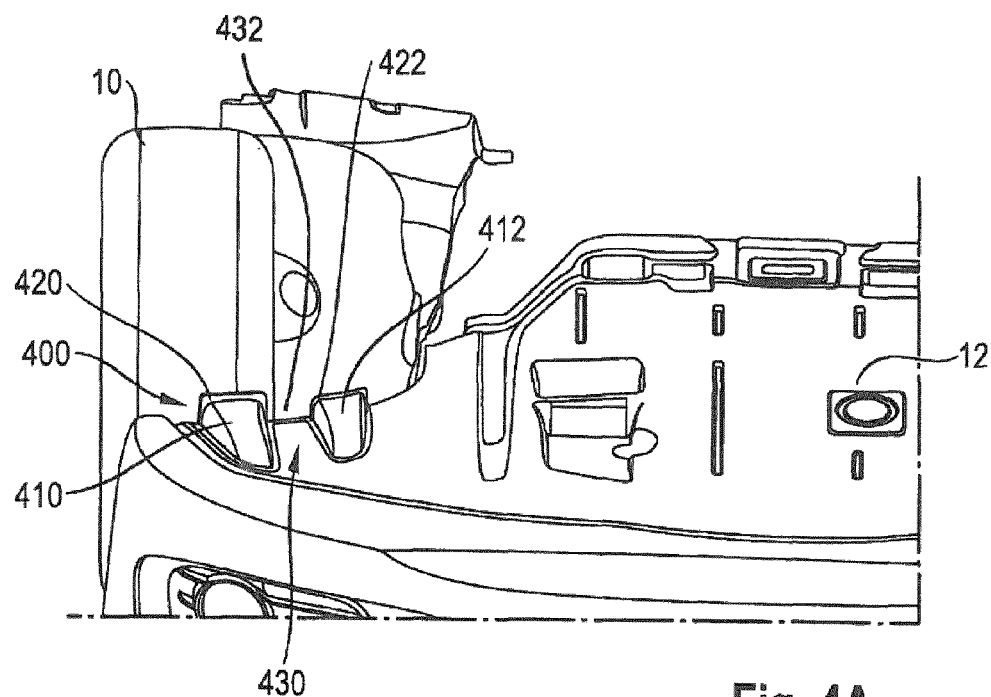
Fig. 4A
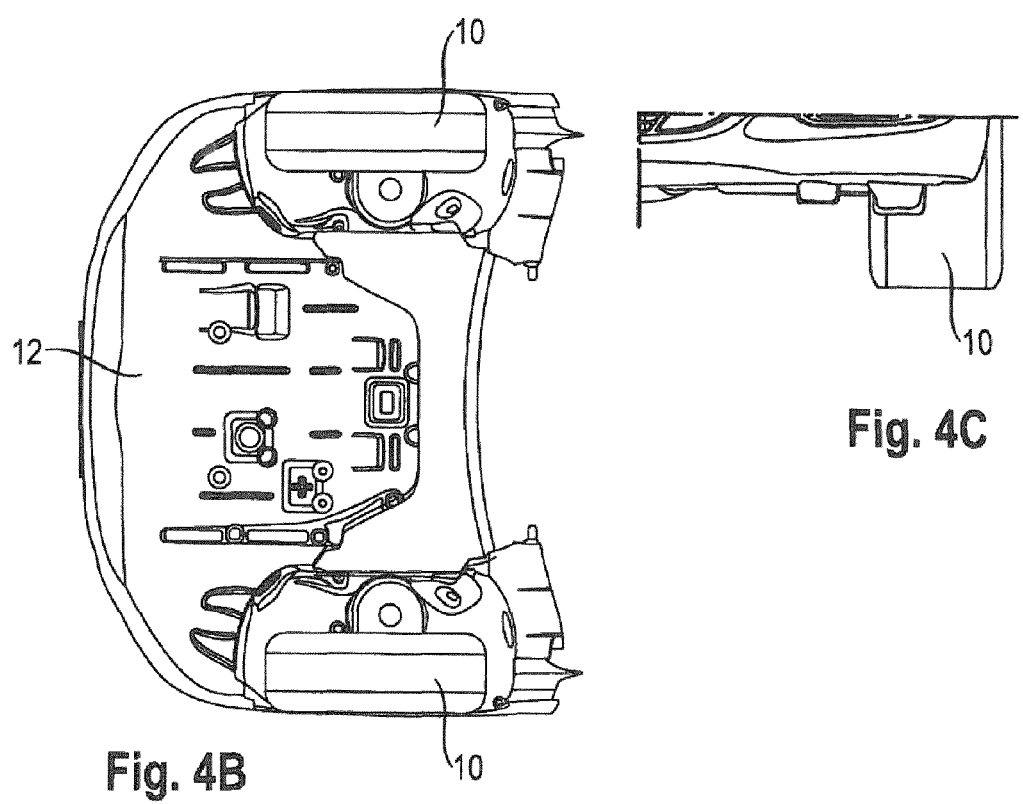
Fig. 4B
Fig. 4C

AIR-GUIDING ARRANGEMENT AND VEHICLE WITH AT LEAST ONE AIR-GUIDING ARRANGEMENT

CROSS REFERENCE TO RELATED APPLICATIONS

This application is a continuation of PCT International Application No. PCT/EP2015/068245, filed Aug. 7, 2015, which claims priority under 35 U.S.C. § 119 from German Patent Application No. 10 2014 215 732.3, filed Aug. 8, 2014, the entire disclosures of which are herein expressly incorporated by reference.

BACKGROUND AND SUMMARY OF THE INVENTION

The invention relates to an air-guiding arrangement and, in particular, to an air-guiding arrangement for a vehicle as well as to a vehicle having the at least one air-guiding arrangement.

Wheel spoilers are arranged as so-called "retaining lips" in front of the wheels of a vehicle and extend approximately transversely to the travel direction. They form air-guiding arrangements which influence a portion of the airstream impinging on a vehicle. Examples of such wheel spoilers are known from European Patent documents EP 2 039 595 A1 and EP 1 674 381 A1 and German Patent Document DE 10 2011 089 074 A1. By means of the wheel spoilers, a flow around the wheels situated behind the latter and the flow through the wheel houses can be influenced, so that, for example, a reduced drag coefficient is obtained in the travel direction. In addition, the balance of the vehicle can be influenced or tuned.

From German Patent document DE 43 34 009 C1, a front-end covering for a motor vehicle is known, wherein air-guiding paths are provided which extend side-by-side in front of a respective front wheel and are curved in the vertical direction of the vehicle, a duct being formed between the air-guiding paths. The duct is oriented against the interior side of the wheel. As a result of the curvature of the respective air-guiding path, which extends convexly with respect to the road, a good aerodynamic flow around the wheel is to be achieved. The retention point of the inflow in front of the wheel is to be changed downwards in the direction of the road, whereby a high pressure in the wheel house in front of the front wheel is to be prevented. The flow through the duct in the direction of the vehicle brakes is to cause an improved brake cooling.

From German Patent document DE 10 2010 055 639 A1, a vehicle is known that has a covering in which the duct is provided in front of the respective front wheel, which duct can be shut off by way of a flap and, in the open condition, guides air to the interior side of the wheel.

From German Patent document DE 10 2010 036 442 A1, an air-guiding device on the underbody of a vehicle in front of a vehicle wheel is known, which is formed of a flexible material and consists of two half-shells that are fastened to the vehicle underbody and form a duct between them. The openings of the half-shells point to the duct. Behind these half-shells, a spoiler is provided which retains the inflowing air. In this case, the retained air penetrates from the duct into the respective half-shell through its opening and inflates the respective half-shell to form a convex structure. In this manner, a more pronounced curvature of these elements of the air-guiding device is to be achieved at high driving speeds, in order to influence the vehicle aerodynamics of the flow under the vehicle.

It is an object of the present invention to provide an air-guiding arrangement, particularly an air guiding arrangement for a vehicle, especially for a passenger car, which improves the convective heat removal at the brake components, the drag coefficient and the lift balance of a vehicle.

This and other objects are achieved by an air guiding arrangement according to embodiments of the present invention, which is arranged in the region in front of a vehicle wheel and protrudes downwards in the direction of the road. The air-guiding arrangement comprises at least one air-guiding body positioned in front of the vehicle wheel. The air-guiding body protrudes from an underbody covering part downwards in the direction of the road. A duct which is situated in the air-guiding body or on the side of the air-guiding body faces away from the exterior side of vehicle. The duct is designed for guiding flowing-in air stream in the direction of the brake system. The air-guiding body has a first retaining lip which is arranged between the air-guiding body and the vehicle wheel and which protrudes downwards in the direction of the road beyond the air-guiding body. On the side of the at least one duct pointing away from the exterior side of the vehicle, a second retaining lip is provided, so that the at least one duct comprises a gap between the first retaining lip and the second retaining lip.

The at least one duct is designed for guiding air in the direction of the brake system, so that the convective cooling of the brake components is improved. This takes place in accordance with the drag and the lift balance. By way of this arrangement, it therefore becomes possible to improve the brake cooling, and it can simultaneously contribute to optimizing the air drag and the lift balance. Such an improved air guidance in the region of the brakes can not only cause an improved cooling of the brakes and surrounding components, but, in addition, reduce the dirtying of the brakes and improve the brake response on wet conditions.

While the air-guiding body definitely is to implement a process of guiding the flow in a specific direction, the retaining lip on or behind its end has the purpose of achieving a retaining effect for the flowing-in air. This retaining effect can advantageously be used for tuning the aerodynamically generated lift of the vehicle. By way of the height of the retaining lip, a defined lift behavior can be generated. As a result, a targeted flow separation can also be generated. It is an additional advantage of a retaining lip that it can laterally protrude in a targeted manner beyond the retaining body, even if the actual retaining body has already ended.

It may also be advantageous, for the size of the retaining body to vary; for example, if a specific lift balance is to occur (larger or smaller lift). Especially a concept of mutually separated bodies offers flexibility in this case. In the case of specific vehicle configurations, for example, one body could even be completely omitted.

An embodiment is advantageous in which the at least one air-guiding body, the at least one retaining lip and the at least one duct are designed as an integral component.

It is also advantageous for the at least one air-guiding body and the first retaining lip to be designed as an integral component, the second retaining lip being a component that is spatially separated therefrom.

Preferably, the at least one air-guiding body, the first retaining lip and the second retaining lip are designed as an integral component.

An embodiment is preferable, in which a second air-guiding body is provided on the side of the at least one duct that points away from the exterior side of the vehicle, which second air-guiding body protrudes downwards from the underbody covering part in the direction of the road, and the second retaining lip is arranged in the travel direction behind the second air-guiding body or on its rearward end and protrudes downwards in the direction of the road beyond the second air-guiding body.

In this case, it is advantageous for the first air-guiding body and the first retaining lip to be designed as a first integral component, and for the second air-guiding body and the second retaining lip to be designed as a second integral component.

The first integral component is preferably arranged in a spatially separated fashion from the second integral component, the at least one duct being constructed between the first integral component and the second integral component.

As an alternative, the first integral component, the second integral component and the at least one duct may be constructed as a single component, with the at least one duct being constructed between the first integral component and the second integral component.

In another embodiment of the invention, the at least one duct further has a ramp which extends from a front side of the vehicle toward the gap.

In this case, an advantageous further development is characterized in that the ramp is formed in an underbody part of the vehicle. As an alternative, the ramp can be integrally constructed in the air-guiding device.

An embodiment of the invention is particularly advantageous, in which a height and/or a width of the duct increases in the direction toward the vehicle wheel.

It is also advantageous for the at least one duct to have a NACA profile.

The air-guiding arrangement is preferably constructed as a one-piece component.

According to a further aspect, a vehicle, particularly a passenger car, is indicated which has the above-described air-guiding arrangement. The at least one air-guiding arrangement is arranged in the region in front of a vehicle wheel and protrudes downwards in the direction of the road.

Preferably, the at least one air-guiding arrangement is constructed in one piece with a wheel housing cover of the vehicle.

According to the embodiments described here, the air-guiding arrangement improves the convective heat removal at the brake components, the drag coefficient and the lift balance.

The air-guiding arrangement may have a modular or partially modular construction or it may be constructed completely as an integral component or it may even be constructed as an integral component with the entire assigned wheel housing cover of the vehicle.

The air-guiding arrangement or its components may consist of a flexible material which does not deform or deforms only very slightly when acted upon by fluid-mechanical forces. However, in the case of a mechanical contact load, which may occur, for example, when driving up or down a curb, the material may permit elastic deformations. Plastic materials of a Shore hardness of 60 to 80, have been found to be well suitable.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 2A to 2C are schematic representations of an air-guiding arrangement according to a second embodiment of the disclosure.

FIGS. 4A to 4C are schematic representations of an air-guiding arrangement according to a fourth embodiment of the disclosure.

DETAILED DESCRIPTION OF THE DRAWINGS

Unless otherwise indicated, identical reference symbols will be used in the following for the same elements or elements having the same effect.

According to an aspect of the present invention, an air-guiding arrangement for a vehicle is indicated, which is arranged in the region in front of a vehicle wheel and protrudes downwards in the direction of the road. The air-guiding arrangement includes at least one air-guiding body, at least one retaining lip, and at least one duct which is designed such that the convective cooling of the brake components will be improved. For this purpose, a portion of the air stream is guided in the direction of the braking system. The air-guiding body may especially be a passive displacement body.

The air-guiding arrangement according to the described embodiments improves the convective heat removal at the brake components, particularly at the forward brake components. It further improves the air drag coefficient of the vehicle and the lift balance.

Figure 1A:
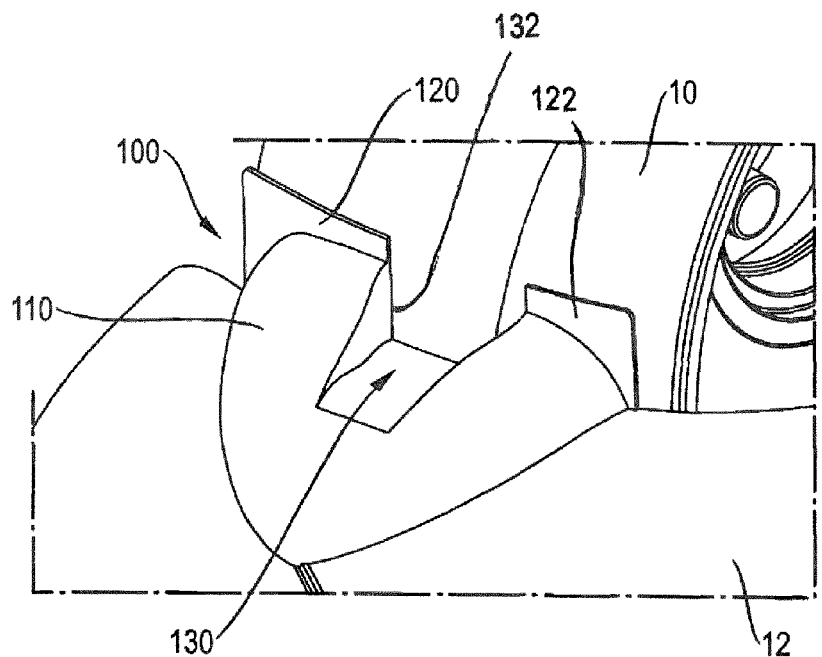
FIGS. 1A to 1C are schematic representations of an air-guiding arrangement according to a first embodiment of the disclosure.
Figure 1B:
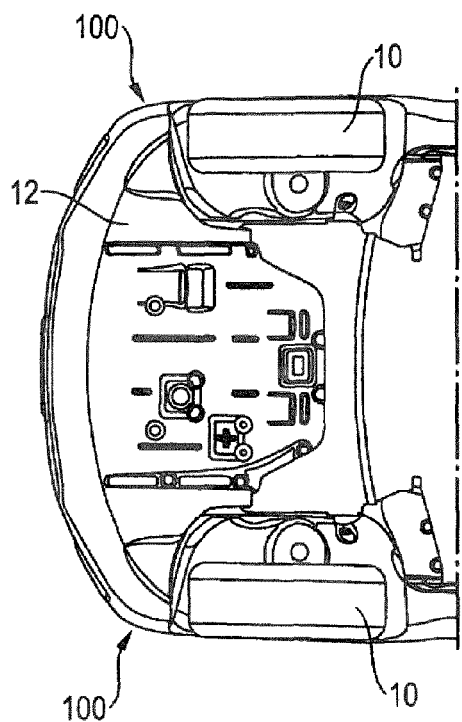
Figure 1C:
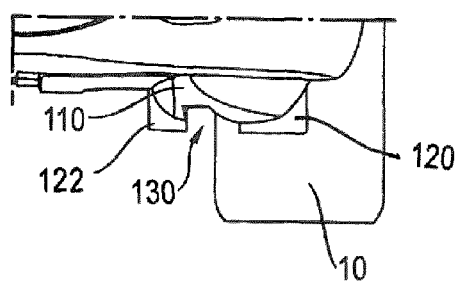

FIGS. 1A to 1C are schematic representations of an air-guiding arrangement 100 according to a first embodiment of the invention.

According to the first embodiment, the air-guiding arrangement 100 is arranged in the region in front of the vehicle wheel 10, and, in particular, is arranged or mounted on the underbody 12 of the vehicle. The air-guiding arrangement 100 includes the at least one air-guiding body 110, an outer retaining lip 120, an inner retaining lip 122 and at least one duct 130, which is designed for guiding air in the direction of the braking system of the vehicle wheel 10. The air-guiding body may also be called a "displacer". According to embodiments, which can be combined with other embodiments described here, the retaining lips 120, 122 are arranged between the at least one air-guiding body 110 and the vehicle wheel 10. In the example of FIGS. 1A to 1C, the retaining lips 120, 122 may also be considered to be one retaining lip divided in two sections by an opening of the duct 130, which forms a gap 132.

According to several embodiments of the invention, the at least one duct 130 is formed in the air-guiding body 110. For example, a height and/or a width of the duct 130 can increase in the direction of the vehicle wheel 10. In several implementations, the at least one air-guiding body 110, the at least one retaining lip 120, 122 and the at least one duct 130 may be constructed as an integral component. The term "integral component" applies to a one piece component. In other words, the at least one air-guiding body 110, the at least one retaining lip 120, 122 and the at least one duct 130 form a single component.

In typical embodiments, which can be combined with other embodiments, the at least one duct forms an air inlet that is advantageous for the flow; it has, for example, an NACA (National Advisory Committee for Aeronautics) opening or is constructed in the form of a nozzle or a diffusor or is provided with an inlet ramp. However, the duct may also simply be a duct without a change of height/width. The surface of one or more of the duct walls may also be provided, at least portions thereof, with a surface structure (for example, with ribs, nubs or depressions).

For example, an inlet of the duct, which may also be called a "NACA inlet", starts tangentially at the contour of the air-guiding body or displacer 110, and increases in width and/or height in the direction of the retaining lips 120, 122. The profile curves are NACA curves, and the recess generated in this manner (also called "cutout" or "embossing") improves, for example, the convective brake cooling.

FIGS. 2A to 2C are schematic representations of an air-guiding arrangement 200 according to a second embodiment of the disclosure.

According to this second embodiment, the air-guiding arrangement 200 comprises a first retaining lip 220 and a second retaining lip 222, wherein the at least one duct 230 comprises a gap 232 between the first retaining lip 220 and the second retaining lip 222. For example, the gap may form the duct or be the duct 230. The at least one air-guiding body 210 and the first retaining lip 220 may be constructed as an integral component, and the second retaining lip 222 may be a component spatially separated therefrom.

The inner-side second retaining lip 222, in addition to influencing the lift coefficients, is also used for improving the convective brake cooling. The combination of the second retaining lip 222 and the gap between the two retaining lips 220, 222 bundles the underbody flow and guides it, for example, into the rim. According to several examples of embodiments, the gap may have a size or width of approximately 10 to approximately 100 mm, and may preferably have a size or width of, for example, approximately 30 to approximately 70 mm.

Figure 3A:
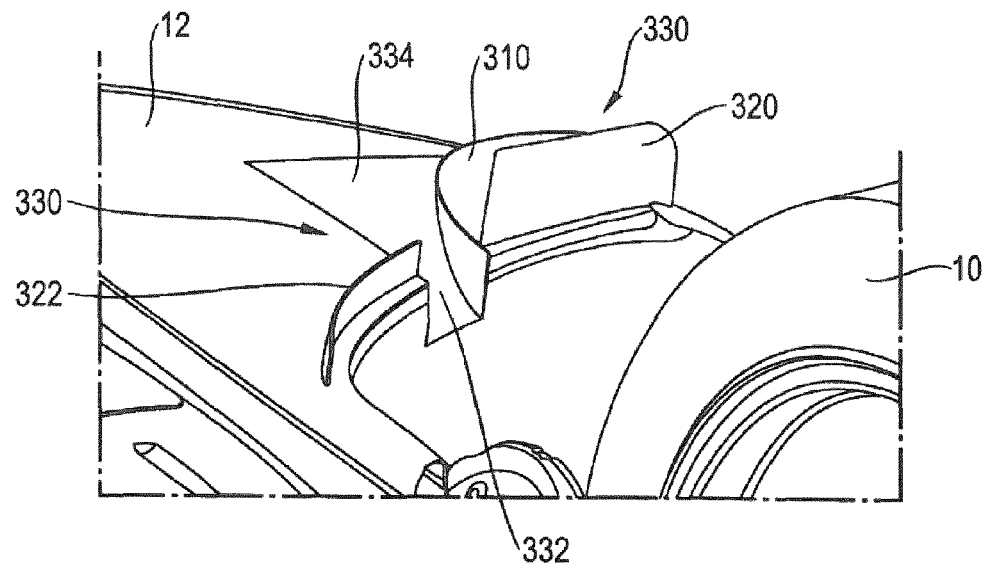
FIGS. 3A and 3B are schematic representations of an air-guiding arrangement according to a third embodiment of the disclosure.
Figure 3B:
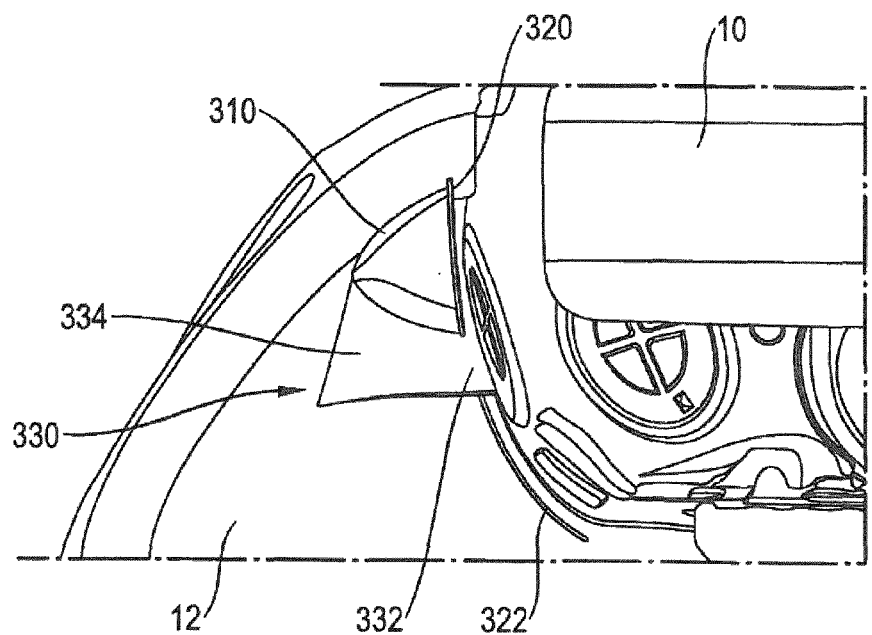

FIGS. 3A and 3B are schematic representations of an air-guiding arrangement 300 according to a third embodiment of the disclosure.

According to this third embodiment, the air-guiding arrangement comprises a first retaining lip 320 and a second retaining lip 322, the at least one duct 330 comprising a gap 332 between the first retaining lip 320 and the second retaining lip 322. The at least one air-guiding body 310 and the first retaining lip 320 can be constructed as an integral component, and the second retaining lip 322 may be a component separated therefrom.

According to several embodiments, which can be combined with other embodiments described here, the at least one duct 330 further has a ramp 334, which extends from a front-end of the vehicle toward the gap 332. The ramp 334 is typically constructed in an underbody of the vehicle. For example, the ramp 334 may be constructed as an indentation in the underbody 12 of the vehicle. The entire arrangement may preferably be a one-piece component or it may even be manufactured such that the entire wheel house shell is an integral component.

The ramp 334 between the two retaining lips 320, 322 can generate a stronger air stream into the wheel house and from there into the rotating rim. As a result, the convective brake cooling can be improved, for example, by a direct or indirect inflow.

FIGS. 4A to 4C are schematic representations of an air-guiding arrangement 400 according to a fourth embodiment of the disclosure.

According to this fourth embodiment, the air-guiding arrangement 400 comprises a first air-guiding body 410, a second air-guiding body 412, a first retaining lip 420 and a second retaining lip 422, in which case the first air-guiding body 410 and the first retaining lip 420 may be constructed as a first integral component, and the second air-guiding body 412 and the second retaining lip 422 may be constructed as a second integral component. It also applies here that the entire air-guiding arrangement may be an integral component or, for example, the air-guiding arrangement and the assigned wheel house shell may even be combined to form an integral component. For example, the first integral component and the second integral component can be arranged in a mutually spatially separated manner. In other words, the first integral component and the second integral component are separate components, which can be mounted separately from one another, for example, on the underbody 12 of the vehicle.

Typically, the at least one duct 430 is arranged between the first integral component and the second integral component. In other words, the at least one duct 430 is formed by the a gap 432 which is created by the distance between the first integral component and the second integral component.

The second inner-side integral component, and particularly the second inner-side air-guiding body or displacer 412, improves a flow bundling on the underbody 12 of the vehicle. In addition, the second inner-side integral component, and particularly the second inner-side air-guiding body or displacer 412, can reduce the air drag of the vehicle and/or optimize the balance.

Figure 5A:
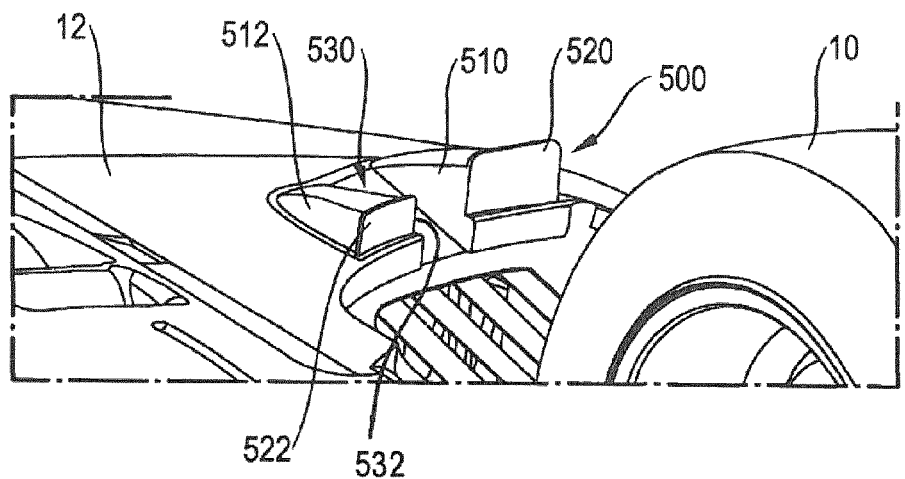
FIGS. 5A and 5B are schematic representations of an air-guiding arrangement according to a fifth embodiment of the disclosure.
Figure 5B:
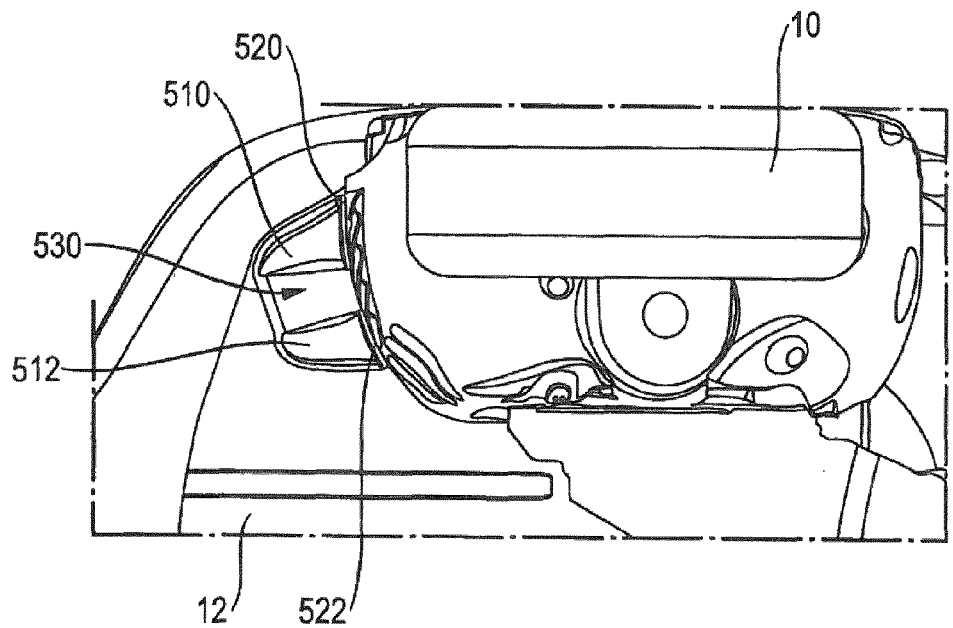

FIGS. 5A and 5B are schematic representations of an air-guiding arrangement 500 according to a fifth embodiment of the disclosure.

According to this fifth embodiment, the air-guiding arrangement 500 comprises a first air-guiding body 510, a second air-guiding body 512, a first retaining lip 520 and a second retaining lip 522, wherein the first air-guiding body 510 and the first retaining lip 520 can be constructed as a first integral component, and wherein the second air-guiding body 512 and the second retaining lip 522 can be constructed as a second integral component.

As illustrated in the example of FIGS. 5A and 5B, the first integral component, the second integral component and the at least one duct 530 can be constructed as a single component, wherein the duct 530 can be constructed while forming a gap 532 between the first integral component and the second integral component. The duct 530 may, for example, comprise the ramp described with respect to FIGS. 3A to 3C, or may have a NACA opening.

The present disclosure of all embodiments provides an improved air-guiding arrangement with respect to an air drag reduction and a lift setting, and further permits a targeted air supply to the brake components. By increasing the air circulation in the wheel rim, an improved brake cooling may be achieved. These improvements are achieved especially by the shape or design and the providing/arrangement of several elements, such as the retaining lips and/or the air-guiding bodies.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. An air-guiding arrangement for a vehicle, which air-guiding arrangement is arranged in a region in front of a vehicle wheel functionally connected to a braking system, comprising:
   at least one air-guiding body, which is positioned in front of the vehicle wheel and protrudes downwards from an underbody covering part in the direction of a road; and
   at least one duct, which is positioned in the air-guiding body or on a side of the air-guiding body facing away from an exterior side of vehicle, which duct is configured to guide an inflowing air stream in a direction of the braking system,
   wherein
   the air-guiding body has a first retaining lip, which is arranged between the air-guiding body and the vehicle wheel and which protrudes downwards in the direction of the road beyond the air-guiding body, and
   on a side of the at least one duct facing away from the exterior side of the vehicle, a second retaining lip is provided, so that the at least one duct comprises a gap between the first retaining lip and the second retaining lip.

2. The air-guiding arrangement according to claim 1, wherein
   the at least one air-guiding body, the at least one retaining lip and the at least one duct are constructed as an integral component.

3. The air-guiding arrangement according to claim 1, wherein
   the at least one air-guiding body and the first retaining lip are constructed as an integral component, the second retaining lip being a component that is spatially separated therefrom.

4. The air-guiding arrangement according to claim 1, wherein
   the at least one air-guiding body, the first retaining lip and the second retaining lip are constructed as an integral component.

5. The air-guiding arrangement according to claim 1, wherein
   a second air-guiding body is provided on the side of the at least one duct that faces away from the exterior side of the vehicle, which second air-guiding body protrudes downwards from the underbody covering part in the direction of the road, and
   the second retaining lip is arranged in the travel direction behind the second air-guiding body or on its rearward end and protrudes downwards in the direction of the road beyond the second air-guiding body.

6. The air-guiding arrangement according to claim 5, wherein
   the first air-guiding body and the first retaining lip are constructed as a first integral component, and the second air-guiding body and the second retaining lip are constructed as a second integral component.

7. The air-guiding arrangement according to claim 6, wherein
   the first integral component is arranged in a spatially separated fashion from the second integral component, the at least one duct being constructed between the first integral component and the second integral component.

8. The air-guiding arrangement according to claim 6, wherein
   the first integral component, the second integral component and the at least one duct are constructed as a single component, the at least one duct being constructed between the first integral component and the second integral component.

9. The air-guiding arrangement according to claim 1, wherein
   the at least one duct further has a ramp, which extends from a front side of the vehicle to the gap.

10. The air-guiding arrangement according to claim 9, wherein
    the ramp is constructed on an underbody part of the vehicle.

11. The air-guiding arrangement according to claim 9, wherein
    the ramp is integrally constructed in the air-guiding device.

12. The air-guiding arrangement according to claim 1, wherein
    a height and/or a width of the duct increases in the direction toward the vehicle wheel.

13. The air-guiding arrangement according to claim 1, wherein
    the at least one duct has a NACA profile.

14. The air-guiding arrangement according to claim 1, wherein
    the air-guiding arrangement is constructed as a one-piece component.

15. A vehicle, comprising at least one air-guiding arrangement according to claim 1.

16. The vehicle according to claim 15, wherein
    the at least one air-guiding arrangement is constructed in one piece with a wheel housing cover of the vehicle.

* * * * *